(12) United States Patent
Chou et al.

(10) Patent No.: US 9,743,007 B2
(45) Date of Patent: Aug. 22, 2017

(54) LENS MODULE ARRAY, IMAGE SENSING DEVICE AND FUSING METHOD FOR DIGITAL ZOOMED IMAGES

(71) Applicant: Altek Semiconductor Corp., Hsinchu (TW)

(72) Inventors: Hong-Long Chou, Hsinchu (TW); Yi-Hong Tseng, Hsinchu (TW)

(73) Assignee: Altek Semiconductor Corp., Hsinchu (TW)

( * ) Notice: Subject to any disclaimer, the term of this patent is extended or adjusted under 35 U.S.C. 154(b) by 0 days.

(21) Appl. No.: 14/943,038

(22) Filed: Nov. 17, 2015

(65) Prior Publication Data
US 2016/0316149 A1    Oct. 27, 2016

Related U.S. Application Data

(60) Provisional application No. 62/151,435, filed on Apr. 23, 2015.

(30) Foreign Application Priority Data

Jul. 28, 2015   (TW) .............................. 104124309 A

(51) Int. Cl.
| | |
|---|---|
| *H04N 5/232* | (2006.01) |
| *H04N 9/04* | (2006.01) |
| *H04N 9/09* | (2006.01) |
| *H04N 5/262* | (2006.01) |
| *H04N 5/225* | (2006.01) |
| *H04N 5/265* | (2006.01) |
| *G02B 13/00* | (2006.01) |

(52) U.S. Cl.
CPC ....... *H04N 5/23296* (2013.01); *G02B 13/001* (2013.01); *H04N 5/2257* (2013.01); *H04N 5/2258* (2013.01); *H04N 5/23232* (2013.01); *H04N 5/265* (2013.01); *H04N 5/2628* (2013.01); *H04N 9/045* (2013.01); *H04N 9/09* (2013.01)

(58) Field of Classification Search
CPC .......... H04N 9/09; H04N 9/097; H04N 5/247; H04N 5/2258; H04N 5/23296; H04N 5/2628; H04N 5/23232; H04N 13/0239; H04N 13/0242; H04N 13/025; H04N 13/0282; H04N 13/0257; G06T 3/40; G06T 3/4007
See application file for complete search history.

(56) References Cited

U.S. PATENT DOCUMENTS

2006/0054782 A1* 3/2006 Olsen ..................... H04N 5/265
                                                           250/208.1
2015/0172543 A1* 6/2015 Laroia ................ H04N 5/23232
                                                            348/218.1

* cited by examiner

*Primary Examiner* — Paul Berardesca
(74) *Attorney, Agent, or Firm* — Jianq Chyun IP Office

(57) ABSTRACT

A lens module array for being assembled to a portable device is provided. The lens module array includes a wide-angle mono lens module, a narrow-angle mono lens module, and two color lens modules. While the wide-angle mono lens module, the narrow-angle mono lens module, and the two color lens modules are assembled onto the portable device, the wide-angle mono lens module, the narrow-angle mono lens module, and the two color lens modules are located at four vertices of a quadrangle, respectively. Besides, the two color lens modules are located at two opposite vertices.

15 Claims, 2 Drawing Sheets

LENS MODULE ARRAY, IMAGE SENSING DEVICE AND FUSING METHOD FOR DIGITAL ZOOMED IMAGES

CROSS-REFERENCE TO RELATED APPLICATION

This application claims the priority benefits of U.S. provisional application Ser. No. 62/151,435, filed on Apr. 23, 2015 and Taiwan application serial no. 104124309, filed on Jul. 28, 2015. The entirety of each of the above-mentioned patent applications is hereby incorporated by reference herein and made a part of this specification.

BACKGROUND OF THE INVENTION

Field of the Invention

The invention relates to a lens module array and particularly relates to a lens module array with four lens modules, an image sensing device, and a fusing method for a digital zoomed image.

Description of Related Art

With the development of technology, various smart electronic devices, such as tablet computers and smart phones, have become indispensable tools for the modern people. In particular, high-end smart electronic devices are equipped with camera lenses that can generate high-quality images which are comparable to those generated by the general digital cameras or may even replace them. The camera lenses of some high-end smart electronic devices can challenge Digital SLRs in pixel number and image quality, and some even have dual lenses for capturing three-dimensional images.

For the electronic device with dual lenses, it is a common application to use the wide-angle lens (one of the dual lenses) to capture a wide-angle image and use the telephoto lens (the other lens) to capture a narrow-angle image, and then select the wide-angle image or the narrow-angle image as the target image according to the magnification for digitally magnifying one single target image to simulate the optical zoom function. However, details of the image may not be retained due to the digital magnification. The image would be blurred as the magnification increases. In the process of zooming the image, if the target image needs to be switched to the wide-angle image or the narrow-angle image, the display of the image may not be smooth or jump.

SUMMARY OF THE INVENTION

The invention provides a lens module array, an image sensing device, and a fusing method for a digital zoomed image to cope with the problem that the conventional dual lens module is unable to satisfy both the requirements of image quality and compact size.

The lens module array of the invention is for being assembled to a portable device. The lens module array includes a wide-angle mono lens module, a narrow-angle mono lens module, and two color lens modules. When the wide-angle mono lens module, the narrow-angle mono lens module, and the two color lens modules are assembled onto the portable device, the wide-angle mono lens module, the narrow-angle mono lens module, and the two color lens modules are located at four vertices of a quadrangle respectively. The two color lens modules are located at two opposite vertices.

The image sensing device of the invention includes an image processing module, a wide-angle mono lens module, a narrow-angle mono lens module, and two color lens modules. When the wide-angle mono lens module, the narrow-angle mono lens module, and the two color lens modules are assembled to a portable device, the wide-angle mono lens module, the narrow-angle mono lens module, and the two color lens modules are located at four vertices of a quadrangle respectively. The two color lens modules are located at two opposite vertices. The image processing module digitally zooms images captured by the wide-angle mono lens module, the narrow-angle mono lens module, and the two color lens modules and fuses the images into a composite image.

The fusing method of a digital zoomed image of the invention includes the following steps. Images are captured by a wide-angle mono lens module, a narrow-angle mono lens module, and two color lens modules respectively. The wide-angle mono lens module, the narrow-angle mono lens module, and the two color lens modules are located at four vertices of a quadrangle respectively. The two color lens modules are located at two opposite vertices. The images captured by the wide-angle mono lens module, the narrow-angle mono lens module, and the two color lens modules are processed into a composite image.

In an embodiment of the fusing method of the invention, a method of processing the images into the composite image includes the following steps. Mono images captured by the wide-angle mono lens module and the narrow-angle mono lens module are fused into a digital zoomed mono image according to a zoom ratio. The digital zoomed mono image and color images captured by the color lens modules are fused into the composite image that conforms to the zoom ratio and is colorful.

In an embodiment of the fusing method of the invention, a method of fusing the digital zoomed mono image and the color images captured by the color lens modules includes the following steps. Pixel alignment is performed on the digital zoomed mono image and the color images captured by the color lens modules respectively. Utilizing the digital zoomed mono image as a basis, color information in the color images captured by the color lens modules is filled into corresponding pixels at corresponding positions in the digital zoomed mono image to obtain the composite image.

In an embodiment of the invention, an angle of view of the wide-angle mono lens module is in a range of 70-80 degrees and an angle of view of the narrow-angle mono lens module is in a range of 35-40 degrees.

In an embodiment of the invention, an angle of view of the two color lens modules is in a range of 70-80 degrees.

In an embodiment of the invention, the quadrangle is square, rectangular, rhombic, or kite-shaped.

In an embodiment of the invention, a total number of pixels of the wide-angle mono lens module is the same as a total number of pixels of the color lens modules.

In an embodiment of the invention, the image processing module includes a storage unit and a processing unit, and the storage unit is coupled to the processing unit.

In an embodiment of the invention, the processing unit includes an image inputting module, an image pre-processing module, a feature point analysis module, an image zooming and warping module, an image fusing module, and a coloring module.

Based on the above, the lens module array, the image sensing device, and the fusing method of a digital zoomed image of the invention utilize the wide-angle mono lens module and the narrow-angle mono lens module. Thus, under the condition that the area of the sensing element remains the same, the invention is able to simulate the narrow-angle optical zooming effect and avoid increasing the overall thickness.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
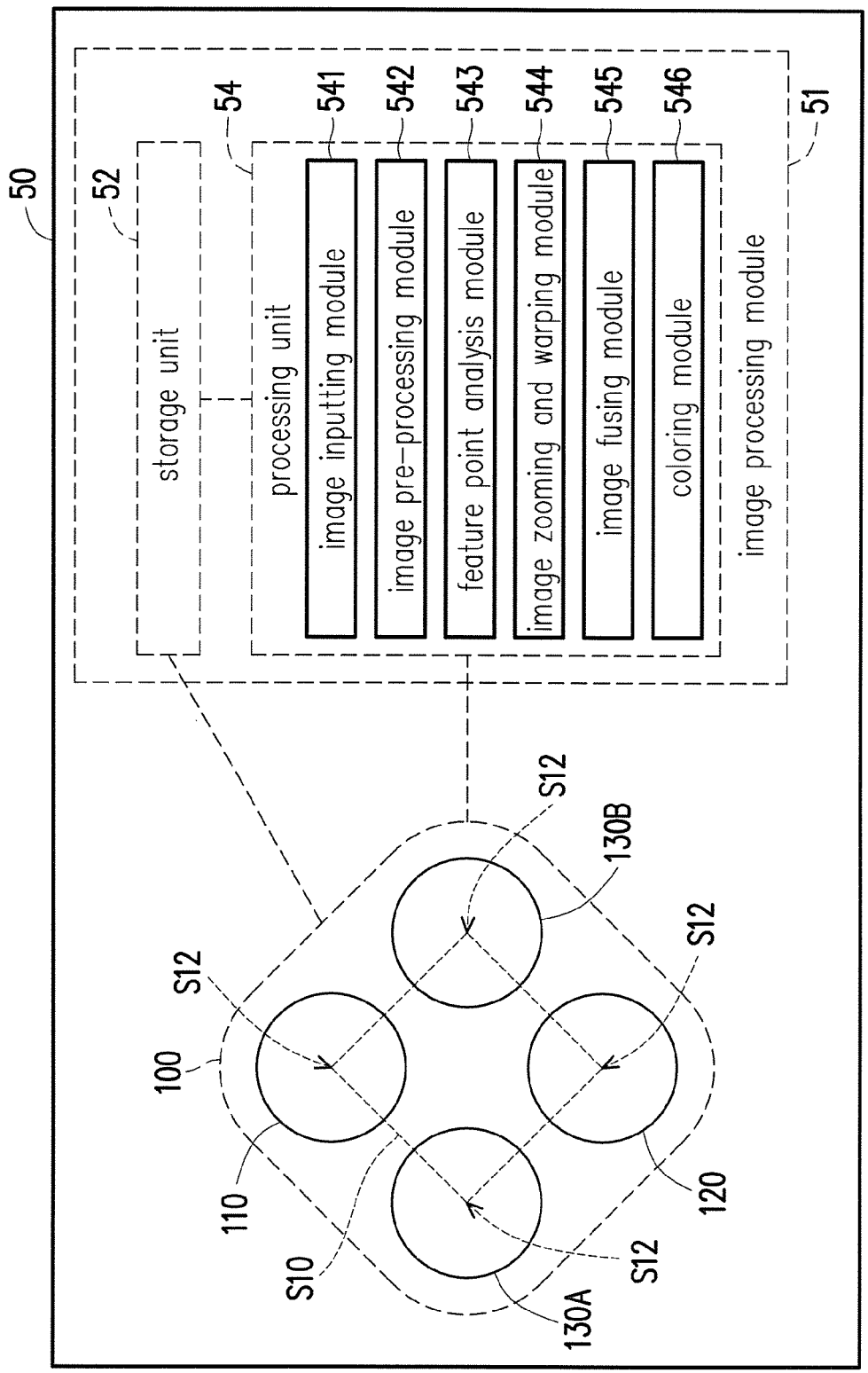
FIG. 1 is a schematic diagram illustrating a lens module array assembled to a portable device according to an embodiment of the invention.

Several embodiments of the invention are described in detail hereinafter with reference to the figures. Regarding the reference numerals mentioned in the following description, the same reference numerals in different figures are deemed to represent the same or similar components. These embodiments are only part of the invention. Not all possible embodiments are disclosed here in this specification. More precisely, these embodiments are merely examples of the device/method defined by the scope of the invention.

FIG. 1 is a schematic diagram illustrating a lens module array assembled to a portable device according to an embodiment of the invention. It should be noted that the diagram is provided to facilitate explanation, not to limit the invention. The lens module array is presented by the physical positions of four lens modules while the other components are illustrated simply by functional blocks.

With reference to FIG. 1, a lens module array 100 of this embodiment is assembled to a portable device 50. In this embodiment, the portable device 50 is an electronic device, such as a smart phone, a tablet computer, a personal digital assistant, and a head mounted display, which has a digital camera, a SLR camera, a digital video camera, a webcam, or other image capturing functions, for example. Nevertheless, the invention is not limited to the foregoing.

The lens module array 100 includes a wide-angle mono lens module 110, a narrow-angle mono lens module 120, and two color lens modules 130A and 130B. When the wide-angle mono lens module 110, the narrow-angle mono lens module 120, and the two color lens modules 130A and 130B are assembled onto the portable device 50, the wide-angle mono lens module 110, the narrow-angle mono lens module 120, and the two color lens modules 130A and 130B are located at four vertices S12 of a quadrangle S10 respectively. Besides, the two color lens modules 130A and 130B are located at two opposite vertices S12. An angle of view of the wide-angle mono lens module 110 is larger than an angle of view of the narrow-angle mono lens module 120. From another aspect, the narrow-angle mono lens module 120 may also be called a telephoto lens module.

All pixels of the wide-angle mono lens module 110 are used for sensing and recording the total luminance of the light that enters the pixel. All pixels of the narrow-angle mono lens module 120 are also used for sensing and recording the total luminance of the light that enters the pixel. In an embodiment, the wide-angle mono lens module 110 and the narrow-angle mono lens module 120 may be black and white lens modules, which record the light intensity regardless of the wavelength range. On the other hand, all pixels of the color lens modules 130A and 130B include pixels for sensing and recording the intensity of light in various wavelength ranges. For example, some pixels are used for sensing and recording the intensity of red light, some are used for sensing and recording the intensity of green light, and some are used for sensing and recording the intensity of blue light. Of course, the light sensed and recorded by the pixels of the color lens modules 130A and 130B is not limited to the red light, green light, and blue light, and may also be other light combinations as long as full-color image recording is achieved.

In comparison with the conventional dual lens module that uses a wide-angle color lens module and a narrow-angle color lens module, the wide-angle mono lens module 110 and the narrow-angle mono lens module 120 of this embodiment achieve higher resolution because the pixels do not need to be grouped to sense lights of different colors. On the other hand, the mono lens module does not have a color filter which is used in the color lens module and thus has a higher light absorbency. Therefore, even in a low-light environment, noise generation may be suppressed effectively and the signal to noise ratio may be improved to generate a clear image. Hence, given that the area of the photosensitive element remains the same, the narrow-angle mono lens module 120 that is thinner in size may provide the same resolution as the conventional narrow-angle color lens module. Thereby, the overall thickness of the lens module array 100 of this embodiment is reduced.

Some aspects of the lens module array 100 of this embodiment are explained below. However, it should be noted that the invention is not limited thereto. In this embodiment, the angle of view of the wide-angle mono lens module 110 is in a range of 70-80 degrees and the angle of view of the narrow-angle mono lens module 120 is in a range of 35-40 degrees. The angle of view refers to an angle included between the leftmost side and the rightmost side of the image that may be captured by the lens module in the horizontal direction. In the case of the same total number of pixels, the angle of view of the image captured by the wide-angle mono lens module 110 is larger and thus a wider image is captured, and the angle of view of the image captured by the narrow-angle mono lens module 120 is smaller and thus more image details are retained. By processing the images captured by the wide-angle mono lens module 110 and the narrow-angle mono lens module 120, a digital zoom function that simulates optical zoom may be provided. Image integration will be described in brief later. In addition, the two color lens modules 130A and 130B are disposed to impart color information to the image obtained through integration. To provide the color information for the widest image, the angle of view of the color lens modules 130A and 130B may be set the same as the angle of view of the wide-angle mono lens module 110, e.g. in the range of 70-80 degrees. Moreover, the total number of pixels of the color lens modules 130A and 130B may be the same as that of the wide-angle mono lens module 110. To facilitate integration of the images of the four lens modules, the quadrangle may be square, rectangular, rhombic, or kite-shaped, for example.

The wide-angle mono lens module 110, the narrow-angle mono lens module 120, and the color lens modules 130A and 130B may include a photosensitive element for sensing the light intensity to generate an image respectively. The photosensitive element is a charge coupled device (CCD) or a complementary metal-oxide semiconductor (CMOS) device, for example. However, it should be noted that the invention is not limited thereto. The wide-angle mono lens module 110, the narrow-angle mono lens module 120, and the color lens modules 130A and 130B are used to capture images of a subject, which may be a specific object or a scene.

With reference to FIG. 1 again, the portable device 50 includes an image processing module 51. The image processing module 51 processes the images captured by the wide-angle mono lens module 110, the narrow-angle mono lens module 120, and the color lens modules 130A and 130B into a composite image. In this embodiment, the image processing module 51 includes a storage unit 52 and a processing unit 54. The storage unit 52 is a fixed or a movable random access memory (RAM) in any form, a read-only memory (ROM), a flash memory, a hard disc, other similar devices, or a combination of the foregoing, for example. The storage unit 52 is coupled to the lens module array 100 for storing the images captured by the wide-angle mono lens module 110, the narrow-angle mono lens module 120, and the color lens modules 130A and 130B.

The processing unit 54 is a central processing unit (CPU), a programmable microprocessor for general or special use, a digital signal processor (DSP), a programmable controller, an application specific integrated circuit (ASIC), a programmable logic device (PLD), other similar devices, or a combination of these devices, for example.

The storage unit 52 is coupled to the lens module array 100 and the processing unit 54 and obtains complete depth information of the subject through the images captured by the wide-angle mono lens module 110 and the narrow-angle mono lens module 120. The processing unit 54 for example includes an image inputting module 541, an image pre-processing module 542, a feature point analysis module 543, an image zooming and warping module 544, an image fusing module 545, and a coloring module 546, which may be loaded to the storage unit 52 to perform the digital zoom function. Steps of a digital zooming method executed by the portable device 50 are explained in detail in the following embodiment.

Figure 2:
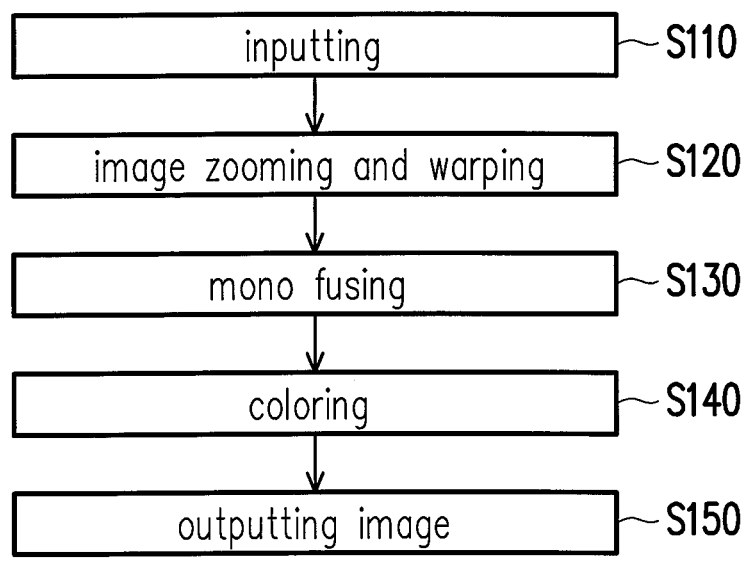
FIG. 2 is a flowchart illustrating a fusing method for a digital zoomed image according to an embodiment of the invention.

FIG. 2 is a flowchart illustrating a fusing method for a digital zoomed image according to an embodiment of the invention. Here, the digital zoomed image is fused using the electronic device of FIG. 1 as an example. With reference to FIG. 1 and FIG. 2, first, the storage unit 52 of the portable device 50 controls the wide-angle mono lens module 110, the narrow-angle mono lens module 120, and the color lens modules 130A and 130B of the lens module array 100 to capture images of a scene respectively, so as to generate four images to be inputted to the image inputting module 541 (Step S110). In this embodiment, a main mono image captured by the wide-angle mono lens module 110 has lower image quality but covers a larger viewing angle range. An auxiliary mono image captured by the narrow-angle mono lens module 120 has higher image quality but covers a smaller viewing angle range, and is used to assist the digital zooming in the subsequent steps.

Next, the images captured by the wide-angle mono lens module 110, the narrow-angle mono lens module 120, and the color lens modules 130A and 130B are processed into a composite image. For example, the image pre-processing module 542 performs image rectification on the main mono image, the auxiliary mono image, and the two color images to generate a main mono rectified image, an auxiliary mono rectified image, and two color rectified images. More specifically, the image pre-processing module 542 rectifies errors of the brightness, color, and geometric position of the four images caused by the wide-angle mono lens module 110, the narrow-angle mono lens module 120, and the color lens modules 130A and 130B respectively.

In this embodiment, the image pre-processing module 542 receives a plurality of rectification parameters in association with the wide-angle mono lens module 110, the narrow-angle mono lens module 120, and the color lens modules 130A and 130B from the storage unit 52. The rectification parameters may include intrinsic parameters and extrinsic parameters of the lens module array 100, which are for performing the image rectification. The intrinsic parameters indicate a conversion relationship between camera coordinates of the lens module array 100 and image coordinates, that is, using a pinhole imaging principle to project the camera coordinates of the lens module array 100 to a projective plane. For example, the intrinsic parameters include focal length, image center, principal point, and distortion coefficient. The extrinsic parameters indicate a conversion relationship between a world coordinate system and a camera coordinate system of the lens module array 100. For example, parameters related to a position and an image capturing direction of the portable device 50 in a three-dimensional coordinate system, such as rotation matrix and translation vector, etc. In addition, the rectification parameters may also include parameters related to illumination compensation or color correction. Nevertheless, the invention is not limited thereto. The image pre-processing module 542 performs the image rectification by rectifying the main mono image, the auxiliary mono image, and the two color images based on the aforementioned rectification parameters.

Thereafter, the feature point analysis module 543 performs feature point detection on the main mono rectified image and the auxiliary mono rectified image, so as to detect an overlapping regions of the main mono rectified image and the auxiliary mono rectified image, thereby obtaining a pixel shift characteristic and pixel depth information of the overlapping regions. More specifically, the feature point analysis module 543 detects a plurality of feature points of the main mono rectified image and the auxiliary mono rectified image by edge detection, corner detection, blob detection, or other feature point detection algorithms. Thereafter, the feature point analysis module 543 finds a group of corresponding feature points of the same characteristic from the feature points described above and identifies the overlapping regions in the main mono rectified image and the auxiliary mono rectified image respectively. The feature point analysis module 543 can calculate a depth of field of each pixel in the overlapping regions of the wide-angle mono lens module 110 and the narrow-angle mono lens module 120 to obtain depth information of the overlapping regions, which is recorded in the form of a depth map, for example.

Then, zooming and warping is performed based on a command inputted by the user, that is, a zoom ratio is changed (Step S120). If the zoom ratio is between 1 and a main/auxiliary mono image ratio, the image zooming and warping module 544 performs zooming and warping on the main mono rectified image, the auxiliary mono rectified image, the two color rectified images based on the zoom ratio, each pixel shift characteristic, and the pixel depth information respectively, so as to generate a main mono warped image, an auxiliary mono warped image, and two color warped images. Here, the "main and auxiliary mono image magnification" refers to the magnification between the main mono rectified image and the auxiliary mono rectified image, which is fixed and determined in advance. The zoom ratio is a degree of change of the size of the main image that the user intends to see or output, and may be set by the user or may be a preset value of the portable device 50. The image zooming and warping module 544 may perform the zooming and warping on the main mono rectified image, the auxiliary mono rectified image, and the two color rectified images based on the zoom ratio by using relative shift, deflection, and depth characteristics of two overlapping regions respectively, so as to generate an image conforming to the zoom ratio requirement of the user and having an overlapping region viewing angle identical to the appearance. In addition, a range of the image warping is associated with the depth information of the two overlapping regions.

Following that, the image fusing module 545 performs image fusing on the overlapping region of the main mono warped image and the auxiliary mono warped image according to the zoom ratio, so as to generate a mono digital zoomed image (Step S130). Specifically, the image fusing module 545 sets weights required for fusing the images for the overlapping regions of the main mono warped image and the auxiliary mono warped image according to the zoom ratio, which are defined as a "first weight-set" and a "second weight-set" respectively. Then, the image fusing module 545 weights a mixing ratio of pixel gray scales of the two overlapping regions by using the first weight-set and the second weight-set to perform image fusing on the two overlapping regions. Here, the product generated by the image fusing is defined as a "fused overlapping region." Thereafter, the image fusing module 545 replaces the overlapping region in the original main mono warped image with the fused overlapping region, so as to generate a high-quality digital zoomed mono image target.

In another embodiment, when the zoom ratio is less than 1, only the main mono rectified image and the two color rectified images are used to perform digital zoom-out and subsequent image warping process and generate the main mono warped image and the two color warped images, and the main mono warped image is directly set as the digital zoomed mono image target. On the other hand, when the zoom ratio is greater than the main/auxiliary mono image magnification, only the auxiliary mono rectified image and the two color rectified images are used to perform digital zoom-in and subsequent image warping and generate the auxiliary mono warped image and the two color warped images, and the auxiliary mono warped image is directly set as the digital zoomed mono image target.

Next, the coloring module 546 first performs pixel alignment on the two color warped images and the digital zoomed mono image target obtained through fusing respectively. Thereafter, with the digital zoomed mono image target as the basis, the pixel color at the corresponding position in the two color warped images is extracted as the color information that each mono pixel lacks and fused and filled in the mono pixel position to generate a composite image, which is a digital zoomed color image, for example (Step S140). Finally, the digital zoomed color image is outputted. For example, the digital zoomed color image obtained by completing the steps described above is displayed on a screen (not shown) of the portable device 50 (Step S150).

To conclude the above, the invention utilizes the images captured by the wide-angle mono lens module and the narrow-angle mono lens module as the basis of the digital zoomed image, thereby significantly improving both the image resolution and the signal to noise ratio. Since the resolution is improved, under the condition that the area of the sensing element remains the same, the thinner narrow-angle mono lens module provides a high-magnification optical zoom effect. Using the color information acquired by the color lens modules allows the coloring module to color the digital zoomed image. In addition, the invention disposes two color lens modules on two sides of the main mono lenses and the auxiliary mono lenses, thereby solving or significantly improving the occlusion problem of the conventional dual lens module during coloring of the coloring module.

It will be apparent to those skilled in the art that various modifications and variations can be made to the disclosed embodiments without departing from the scope or spirit of the invention. In view of the foregoing, it is intended that the invention covers modifications and variations provided that they fall within the scope of the following claims and their equivalents.

What is claimed is:

1. A lens module array for being assembled to a portable device, the lens module array comprising:
   a wide-angle mono lens module;
   a narrow-angle mono lens module; and
   two color lens modules,
   wherein when the wide-angle mono lens module, the narrow-angle mono lens module, and the two color lens modules are assembled onto the portable device, the wide-angle mono lens module, the narrow-angle mono lens module, and the two color lens modules are located at four vertices of a quadrangle respectively, and the two color lens modules are located at two opposite vertices.

2. The lens module array according to claim 1, wherein an angle of view of the wide-angle mono lens module is in a range of 70-80 degrees and an angle of view of the narrow-angle mono lens module is in a range of 35-40 degrees.

3. The lens module array according to claim 2, wherein an angle of view of the two color lens modules is in a range of 70-80 degrees.

4. The lens module array according to claim 1, wherein the quadrangle is square, rectangular, rhombic, or kite-shaped.

5. The lens module array according to claim 1, wherein a total number of pixels of the wide-angle mono lens module is the same as a total number of pixels of the color lens modules.

6. An image sensing device, comprising:
   an image processing module;
   a wide-angle mono lens module;
   a narrow-angle mono lens module; and
   two color lens modules,
   wherein when the wide-angle mono lens module, the narrow-angle mono lens module, and the two color lens modules are assembled onto a portable device, the wide-angle mono lens module, the narrow-angle mono lens module, and the two color lens modules are located at four vertices of a quadrangle respectively and the two color lens modules are located at two opposite vertices, and the image processing module processes images captured by the wide-angle mono lens module, the narrow-angle mono lens module, and the two color lens modules into a composite image respectively.

7. The image sensing device according to claim 6, wherein an angle of view of the wide-angle mono lens module is in a range of 70-80 degrees and an angle of view of the narrow-angle mono lens module is in a range of 35-40 degrees.

8. The image sensing device according to claim 7, wherein an angle of view of the two color lens modules is in a range of 70-80 degrees.

9. The image sensing device according to claim 6, wherein the quadrangle is square, rectangular, rhombic, or kite-shaped.

10. The image sensing device according to claim 6, wherein a total number of pixels of the wide-angle mono lens module is the same as a total number of pixels of the color lens modules.

11. The image sensing device according to claim 6, wherein the image processing module comprises a storage unit and a processing unit, and the storage unit is coupled to the processing unit.

12. The image sensing device according to claim 11, wherein the processing unit comprises an image inputting module, an image pre-processing module, a feature point analysis module, an image zooming and warping module, an image fusing module, and a coloring module.

13. A fusing method of a digital zoomed image, the method comprising:
  capturing images by a wide-angle mono lens module, a narrow-angle mono lens module, and two color lens modules respectively, wherein the wide-angle mono lens module, the narrow-angle mono lens module, and the two color lens modules are located at four vertices of a quadrangle respectively, and the two color lens modules are located at two opposite vertices; and
  processing the images captured by the wide-angle mono lens module, the narrow-angle mono lens module, and the two color lens modules into a composite image.

14. The fusing method according to claim 13, wherein a method of processing the images into the composite image comprises:
  fusing mono images captured by the wide-angle mono lens module and the narrow-angle mono lens module into a digital zoomed mono image according to a zoom ratio; and
  fusing the digital zoomed mono image and color images captured by the color lens modules into the composite image that conforms to the zoom ratio and is colorful.

15. The fusing method according to claim 14, wherein a method of fusing the digital zoomed mono image and the color images captured by the color lens modules comprises:
  performing pixel alignment on the digital zoomed mono image and the color images captured by the color lens modules respectively; and
  utilizing the digital zoomed mono image as a basis and filling color information in the color images captured by the color lens modules into corresponding pixels at corresponding positions in the digital zoomed mono image to obtain the composite image.

* * * * *